Figure 1:
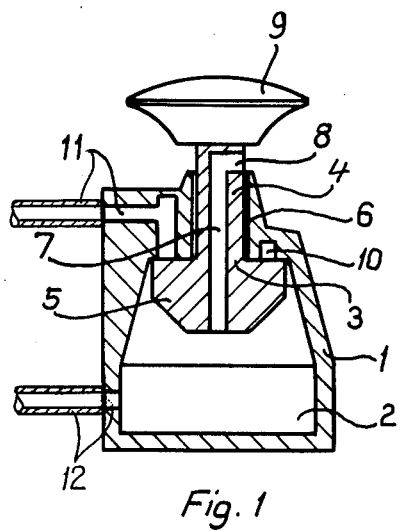

United States Patent [19]

Olander

[11] 4,023,588
[45] May 17, 1977

[54] CONTROL DEVICE FOR MILKING MACHINES

[75] Inventor: Karl Erik Olander, Sodertalje, Sweden

[73] Assignee: Alfa-Laval AB, Tumba, Sweden

[22] Filed: Sept. 2, 1975

[21] Appl. No.: 609,902

[30] Foreign Application Priority Data

Sept. 11, 1974 Sweden .............................. 7411451

[52] U.S. Cl. .......................... 137/103; 137/625.27; 119/14.08; 119/14.39
[51] Int. Cl.[2] ......................................... A01J 5/10
[58] Field of Search .................. 137/625.25, 625.26, 137/625.4, 625.49, 625.50, 625.68, 625.27, 102, 103; 119/14.08, 14.29, 14.39, 14.40, 14.41, 14.30, 14.55

[56] References Cited

UNITED STATES PATENTS

| 2,507,969 | 5/1950 | Gascoigne | 119/14.55 |
| 2,564,686 | 8/1951 | Gray | 137/625.26 |
| 2,601,989 | 7/1952 | Modes | 137/625.4 |
| 2,694,380 | 11/1954 | Harstick | 137/625.69 X |
| 3,910,466 | 10/1975 | Collar | 137/625.68 X |

FOREIGN PATENTS OR APPLICATIONS

| 595,728 | 4/1934 | Germany | 137/625.26 |
| 563,390 | 8/1944 | United Kingdom | 119/14.55 |

*Primary Examiner*—Alan Cohan
*Attorney, Agent, or Firm*—Cyrus S. Hapgood

[57] ABSTRACT

The housing of a control device forms a chamber into which opens a milking machine conduit communicating alternately with a vacuum source and a pressure source, there being a separate connection between the chamber and the pressure source which is independent of the conduit. A valve member in the chamber is operable from outside the housing and has a first position where it blocks the opening of the conduit into the chamber while uncovering said separate connection, whereby the valve member is sucked against said opening and thus held in its first position when vacuum prevails in the conduit. When the conduit is placed in communication with the pressure source, the valve member automatically moves to a second position where it uncovers the opening of the conduit into the chamber while blocking said separate connection; and the valve member can be returned to its first position only by manual operation from outside the housing.

8 Claims, 2 Drawing Figures

CONTROL DEVICE FOR MILKING MACHINES

The present invention relates to a device for use in a milking machine to break temporarily, but thereafter make it possible to open automatically, a connection between a chamber and a conduit leading thereto and which is arranged to communicate alternately with a vacuum source and a pressure source, such as the surrounding atmosphere.

A device of this kind may be used, for example, when the milking machine comprises an arrangement for automatically changing the degree of the pulsation vacuum during the milking, depending on the rate of the mild flow which leaves the cow.

In this connection, it may be desirable during an opening stage of the milking (when the milk flow rate is relatively low) to control the aforementioned valve by an imposed force so that a strong pulsation vacuum is obtained in spite of the low rate of milk flow. When the milk flow rate has increased to a certain value, the valve is to remain in the position in which a strong pulsation vacuum is obtained, but the forced control imposed on the valve is to cease automatically so that at the end of the milking, when the rate of milk flow again decreases, the valve is automatically shifted to reduce the pulsation vacuum.

The present invention has for its principal object to provide a device which in a very simple way solves this and other similar problems in a milking machine. Exactly the same problem exists, for example, when the milking machine is equipped with special means for automatic removal of the teat cup cluster from a cow when the milk flow from the cow has ceased or fallen to a certain rate.

The device according to the invention comprises the aforementioned chamber and a conduit leading thereto and arranged to communicate alternately with a vacuum source and a pressure source, such as the surrounding atmosphere. The device is characterized by a valve member placed in the chamber but operable from outside the chamber and having a first position in which it blocks the opening of said conduit in the chamber and at the same time uncovers a special connection between the chamber and said pressure source, so that when vacuum prevails in the conduit the valve member is sucked against the opening of the conduit in the chamber and is kept in this position. In addition, the valve member is arranged to be actuated by a force which causes it to take automatically a second position, when the chamber is connected to the pressure source, in which the chamber communicates with the conduit while the special connection between the chamber and the pressure source is broken.

By means of this device, the chamber may be connected manually to the pressure source by way of a special connection, after which said connection is automatically maintained until the normal connection with the pressure source is established, that is, by way of said conduit.

The valve member may be arranged to take said second position either by means of gravity or by means of a spring force. In a preferred embodiment of the device, said conduit leads to the roof of the chamber, and the valve member is arranged to take its second position by its own weight when the conduit is connected to the pressure source.

The valve member is preferably actuable from outside the chamber by means of a spindle shaped as a part of the valve member and extending out through the wall of the chamber. The special connection between the chamber and the pressure source may then be shaped as a groove in the spindle and/or in the wall of the chamber where the spindle extends out through the same. In a preferred embodiment of the invention, the special connection consists of a central axial bore in the spindle, which constantly communicates with the chamber and a duct leading from the boring, which leads to the circumference of the spindle in such a way that is communicates with the surrounding atmosphere when the valve member is located in the said first position but blocked by the wall of the chamber when the valve member is located in the said second position.

Figure 2:
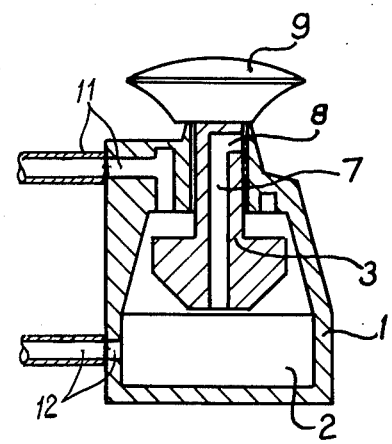

The device according to the invention is described further below with reference to the accompanying drawing, in which FIG. 1 is a cross-sectional view of an embodiment of the invention, showing the valve member in its first position where the chamber communicates with the atmosphere by way of the special connection, and FIG. 2 is a similar view showing the valve member in the second position where the chamber communicates with said conduit.

As may be seen in FIG. 1, the device according to the invention comprises a housing 1 forming a chamber 2. In the chamber 2 is a valve member 3 comprising a spindle 4 and a valve body 5. The spindle 4 is arranged to extend out through a hole 6 in the wall of the housing, whereby the valve member 3 is operable from outside the chamber. In the spindle 4 is a groove comprising a central axial bore 7, which also extends centrally through the valve body 5 connected to the spindle and leads to the side of the valve body which faces the chamber 2. The groove consequently communicates with the chamber 2 constantly. The groove also comprises a duct 8 leading from the upper part of the bore 7 to the circumference of the spindle. In the position shown in FIG. 1, the chamber 2 communicates with the atmosphere through the groove 7–8. On the outside of the chamber, the spindle carries a body 9 by means of which the spindle 4 may be lifted to the position shown in FIG. 1. In this position, the valve body 5 blocks an annular opening 10 of a conduit 11 arranged to communicate alternately with a vacuum source and a pressure source. The opening 10 of the conduit in the chamber may, of course, have the form of a slit or a round hole instead, but an annular opening offers great advantages. In the embodiment of the invention shown in the drawing, the annular opening 10 surrounds the hole 6. With this symmetrical arrangement, the valve body 5 is effectively sucked against the parts of the chamber wall which surround the opening 10 of the conduit 11, when vacuum prevails in the conduit 11. The chamber 2 is connected to pressure-actuated means in a milking machine (not shown) by way of another conduit 12.

In the second position of the valve member 3 shown in FIG. 2, the chamber is connected to the conduit 11, and the valve body 9 bears tightly on the outside of the chamber wall, whereby atmospheric air is prevented from entering the chamber between the spindle 4 and the surrounding wall of the housing 1. In this way, the accuracy of manufacture of the hole 6 in the housing wall and the spindle 4 does not need to be as great as in the case where a sliding fit is provided between these parts. In the position shown in FIG. 2, the duct 8 leading from the bore 7 is blocked by the wall of the housing which surrounds the hole 6.

In the embodiment shown in the drawing, the chamber 2 is limited at its lower part by a rigid wall. This lower limit of the chamber may instead consist of a membrane fastened in the wall of the chamber and actuated by the pressure conditions in the chamber 2. This membrane may in turn actuate a valve in order to change the degree of the pulsation vacuum.

In the operation of the device, at the beginning of the milking the conduit 11 has been connected to the vacuum source by way of milk flow indicating means (not shown). During an opening stage, however, it may be desirable to bread the connection between the device and pressure-actuated means in a milking machine which are connected to the device and the conduit. This is achieved by lifting the valve member 3 by means of the body 9 to the position shown in FIG. 1. As a result, the valve body 5 is sucked against the opening 10 of the conduit 11 and the chamber 2 is connected to the pressure source (the surrounding atmosphere) by way of the groove 7–8. Atmospheric pressure will thus prevail also in the pressure-actuated means to which conduit 12 leads, in spite of the fact that vacuum prevails in the conduit 11. When the milk flow increases, the conduit 11 is connected to the pressure source and the valve member automatically takes the position shown in FIG. 2 due to its own weight. The chamber 2 then communicates with the conduit 11 so that atmospheric pressure will continue to prevail in the pressure-actuated means connected to conduit 12. When the milk flow ceases at the end of the milking, the conduit 11 is connected to the vacuum source, and the resulting pressure change is then transmitted by way of chamber 2 and conduit 12 to the pressure-actuated means in the milking machine. The latter means, being now subjected to vacuum, effect a change to a more gentle after-milking and/or a removal of the teat cup cluster from the cow.

If desired, the body 9 may be provided with bellow-like means connected by a conduit to the groove 7–8 so that the same pressure is obtained in the interior of such means as in the chamber 2. Depending on the pressure in the chamber, the bellows will be compressed or expanded. Such bellow-like means may, of course, just as well be placed somewhere else on the outside of the chamber. With such an arrangement, it is possible to judge from the outside which pressure prevails in the chamber 2.

I claim:

1. In combination with a conduit communicating alternately with a vacuum source and a pressure source, a control device comprising a housing forming a chamber into which said conduit has an opening, there being a separate connection between the chamber and the pressure source which is independent of said conduit, a valve member located in said chamber and operable from outside the chamber, the valve member having a first position in which it blocks said opening of the conduit into the chamber while uncovering said separate connection so that, when vacuum prevails in the conduit, the valve member is sucked against said opening and thus maintained in said first position, the valve member being movable automatically to a second position in response to the conduit communicating with the pressure source, the valve member in said second position uncovering said opening of the conduit into the chamber while blocking said separate connection.

2. The device of claim 1, in which the valve member is movable to said second position by gravity.

3. The device of claim 1, in which said opening of the conduit is in the roof of the chamber, the valve member being movable to its second position by gravity in response to the conduit communicating with the pressure source.

4. The device of claim 1, in which the valve member includes an axially movable spindle extending through a wall of the housing, said separate connection including a groove located in the spindle and communicating with said chamber in all positions of the valve member, said groove having an extension which leads to the outside of the housing in said first position of the valve member and which is blocked by said housing wall in said second position of the valve member.

5. The device of claim 4, in which said groove includes a central axial bore in the spindle and a passage leading from said bore to the circumference of the spindle.

6. The device of claim 1, in which the valve member includes a spindle extending through a wall of the housing with a clearance, the valve member also including a body carried by the spindle outside the housing and which, when the valve member is in said second position, bears tightly against the outside of said housing wall to prevent atmospheric air from entering the chamber through said clearance.

7. The device of claim 1, in which said opening of the conduit into the chamber is annular and is surrounded by part of the chamber wall, the valve member including a valve body which bears on said wall part when the valve member is in said first position.

8. The device of claim 7, in which the valve member also includes a spindle extending through a hole in the chamber wall, said annular opening surrounding said hole.

* * * * *